United States Patent [19]

Ishii

[11] Patent Number: 5,339,356
[45] Date of Patent: Aug. 16, 1994

[54] VIRTUAL PRIVATE NETWORK CONNECTING SYSTEM

[75] Inventor: Tadao Ishii, Kawasaki, Japan

[73] Assignee: Fujitsu Limited, Kawasaki, Japan

[21] Appl. No.: 854,308

[22] Filed: Mar. 17, 1992

[30] Foreign Application Priority Data

Mar. 20, 1991 [JP] Japan .................................. 3-056570

[51] Int. Cl.⁵ .......................... H04M 7/00; H04M 3/00
[52] U.S. Cl. .................................... 379/234; 379/220;
379/225; 379/228; 379/231; 379/233; 379/243;
379/280
[58] Field of Search ............... 379/207, 225, 234, 219,
379/220, 221, 228, 229, 231, 233, 243, 369, 280

[56] References Cited

U.S. PATENT DOCUMENTS 5,212,691  5/1993  Hokari .................. 379/234 X

*Primary Examiner*—James L. Dwyer
*Assistant Examiner*—Harry S. Hong

[57] ABSTRACT

A virtual private network connecting system in a virtual private network is formed by accommodating in a public network a plurality of PBX units each assigned a unique private office number (ON), the system executed by the units comprising in each of the PBX unit. A virtual private network connecting system comprises number converting units for converting a private office number (ON) to a subscriber number (SN) assigned to the destination PBX unit by the public network and identifying the system of terminating connecting a call from the public network to the destination PBX unit when an extension accommodated in the PBX unit issues a call and dials the private office number (ON) assigned to the destination PBX unit, and outgoing call control units for controlling communication between the called extension accommodated in the destination PBX unit through the public network according to the number conversion result provided by the number converting units and the identification of the system of terminating connection.

8 Claims, 17 Drawing Sheets

VIRTUAL PRIVATE NETWORK CONNECTING SYSTEM

BACKGROUND OF THE INVENTION

The present invention relates to a virtual private network connecting system for connecting a plurality of private branch exchange (PBX) units accommodated in a public network by specifying numbers as if they were operated in a private network.

Private communication networks have become more and more important to efficiently perform business activities. The private communication can be conducted through public networks, but private networks can also be established such that a corporate private network, for example, a local area network, is configured using leased lines of common carriers as exclusive inter-office lines. In such private networks, inter-office communication can be made by dialing a private office number assigned to each office and an extension number of each office.

Private networks reduce the total amount of charges on long distance calls. However, they require various kinds of units and operations, expenses for equipment and maintenance, and personnel involved. Therefore, a virtual private network has been developed in order to establish a virtual network for private use using public networks without providing leased lines. The virtual private network is explained by referring to FIG. 1.

FIG. 1 is a block diagram for explaining the virtual private network of the prior art technology.

In FIG. 1, a plurality of PBX units 1 (each of them is designated 1-1, 1-2, . . . ) each belonging to the same company are connected to a public network 2 through office lines 3 each having a unique subscriber number SN assigned by the public network 2.

The public network 2 provides a virtual private network for connecting the PBX units 1 using private office numbers ON exclusively used in the company. To realize the service, the public network 2 has a specific switching unit 21-0 provided with a virtual private network center 22.

When an extension 4-1 accommodated in any PBX unit 1-1 issues a call and dials an identification number for the virtual private network service, a private office number ON of a destinating PBX 1-2, and a called extension number EN, the originating PBX unit 1-1 connects the call to an office line 3-1 and sends the identification number, the private office number ON and the extension number EN to a switching unit 211.

The switching unit 21-1 accommodating the originating PBX unit 1-1 recognizes that the PBX unit 1-1 is provided with the virtual private network service, and transmits the private office number ON to the virtual private network center 22 through the public network 2.

The virtual private network center 22 is provided with a function of converting a private office number ON assigned to each PBX unit 1 to a subscriber number SN, converts the transmitted private office number ON to the subscriber number SN, and sends it back to the originating switching unit 1-1. Afterwards, assuming that the subscriber number SN sent back from the virtual private network center 22 is received by the switching unit 21-1, the extension number EN received from the originating PBX unit 1-1 to specify the extension 4-2 is transmitted to the destination PBX unit 1-2 after connecting, according to the well-known procedure, the originating PBX unit 1-1 to the destination PBX unit 1-2 through the public network 2.

As described above, the conventional public network is provided with the virtual private network center 22 in order to realize a virtual private network service, and the virtual private network center 22 converts a private office number ON sent from the originating PBX unit 1-1 to a subscriber number SN. Therefore, a virtual private network service may not be offered to a public network 2 in which a virtual private network center 22 is not installed.

SUMMARY OF THE INVENTION

An object of the present invention is to provide a virtual private network service without installing any specific unit to a public network.

The virtual private network connecting system of the present invention comprises in each PBX unit, a number converter for converting a private office number (ON) to a subscriber number (SN) assigned to a destination PBX unit by the public network and identifying the method of terminating a call from the public network to the destination PBX unit when an extension accommodated in the PBX unit issues a call and dials the private office number (ON) assigned to the destination PBX unit, and a outgoing call controller for controlling the connection between the called extension accommodated in the destination PBX unit through the public network according to the number conversion result provided by the number converter and the terminating connection method identified.

In the above described configuration of the present invention a virtual private network is established without adding a special unit to a public network, which can be widely applied to private communication networks of all types of organizations.

DESCRIPTION OF THE PREFERRED EMBODIMENTS OF THE PRESENT INVENTION

Figure 1:
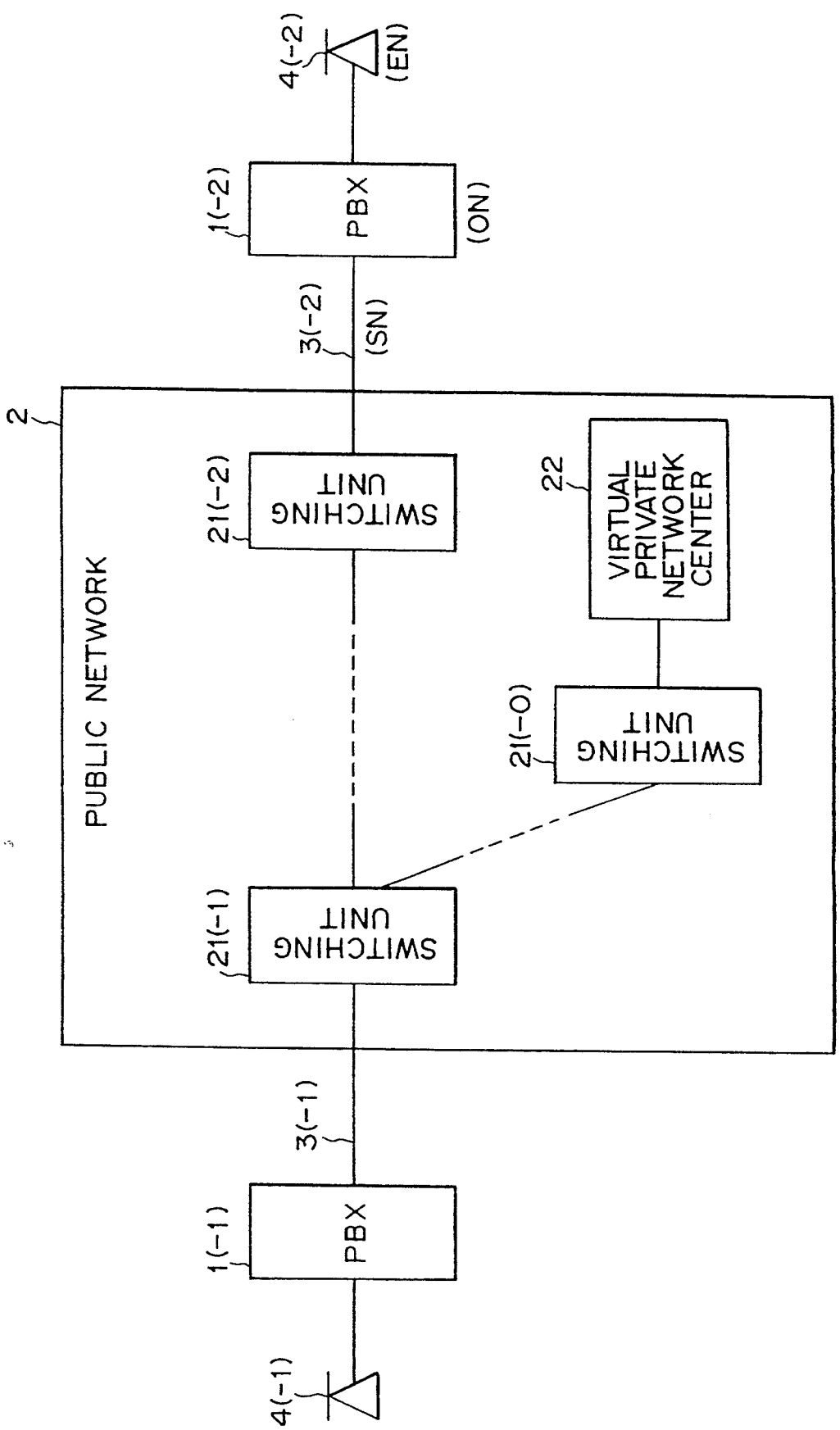
FIG. 1 is a block diagram for explaining the virtual private network of the prior art.
Figure 2:
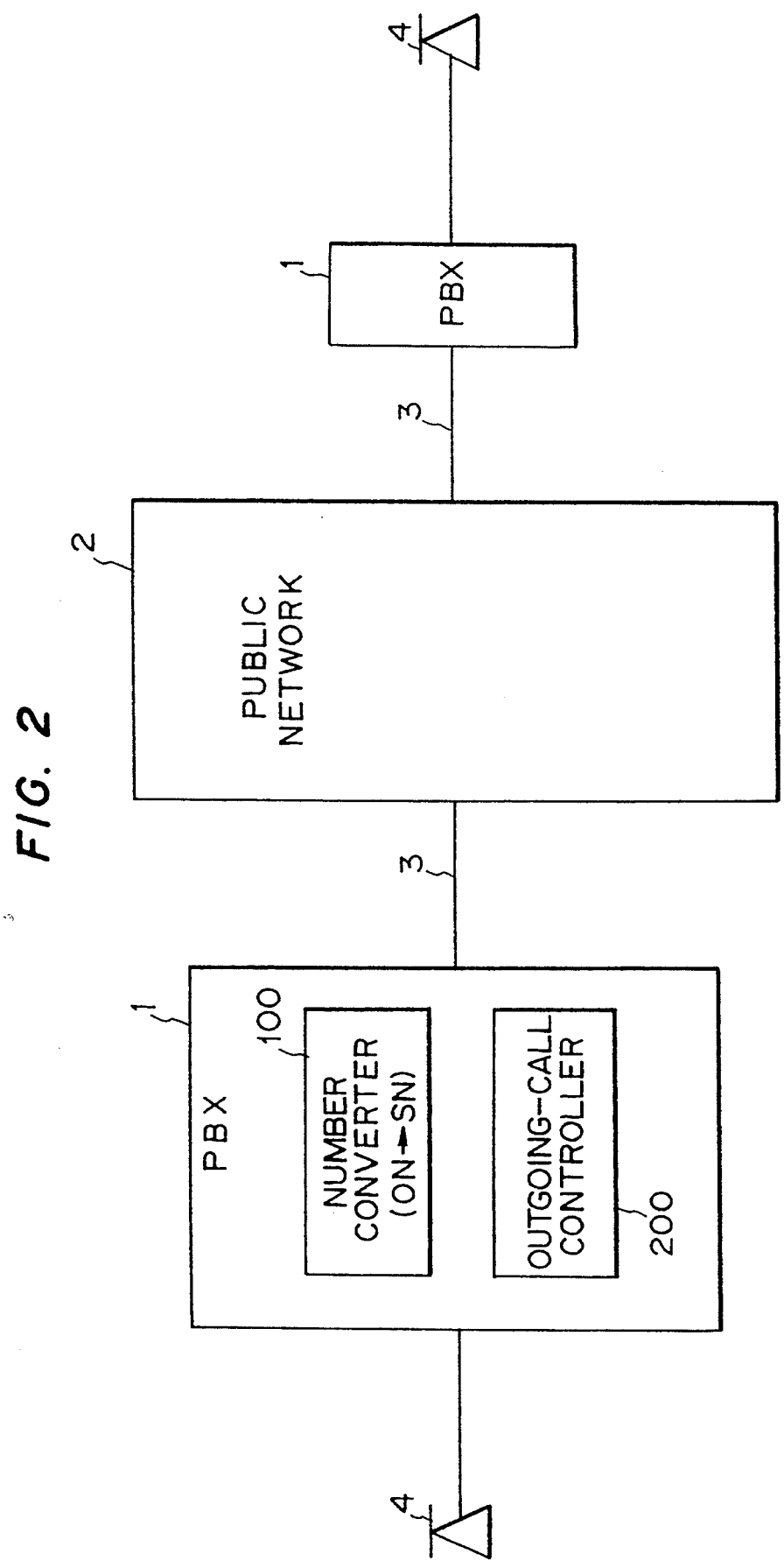
FIG. 2 is a block diagram for explaining the principle of the present invention.

FIG. 2 is a block diagram for explaining the principle of the present invention.

In FIG. 2, a PBX unit 1 is an object to be disclosed by the present invention; a public network 2 accommodates each PBX unit 1; office lines 3 connect the public network to each PBX unit 1; and extensions 4 are accommodated in each PBX unit 1.

A number converter 100 and an outgoing call controller 200 are provided in the PBX unit 1.

Each of the PBX units 1 is assigned a unique private office number ON.

The number converter 100 converts a private office number to a subscriber number SN assigned by the public network 2 to the destination PBX unit 1, outputs it, and identifies the method of terminating a call from the public network 2 to the destination PBX unit 1 when an extension accommodated in the PBX unit 1 issues a call and dials the private office number ON assigned to the destination PBX unit 1.

After identifying the terminating connection method for a call from the public network to the destination PBX unit 1, the outgoing call controller 200 controls the connection of the call to the destination PBX unit 1 through the public network 2 according to the terminating connection method.

On identifying the terminating connection method for the destination PBX unit 1 as Direct Inward System Access (DISA) method, the outgoing call controller 200 controls a transmission of a subscriber number SN outputted by the number converter 100 to the public network 2. Then, according to the procedure performed in the DISA method, the outgoing call controller 200 controls a transmission of the extension number following the private office number dialed by the extension 4 to the destination PBX unit 1 through the public network 2.

On identifying the method of terminating a call to the destination PBX unit 1 as a direct dial-in (DID) method, the outgoing call controller 200 controls the transmission to the public network 2 a subscriber number SN outputted by the number converter 100 and the extension number EN following the private office number ON dialed by the extension 4.

Therefore, since each of the PBX units converts to a subscriber number connectable to a destination PBX unit through a public network the private office number sent by a originating extension, and the subscriber number is sent according to the terminating connection method applicable to a destination PBX unit, a virtual private network service can be realized without any specific unit in the public network.

An embodiment of the present invention is described below by referring to the attached drawings.

Figure 3:
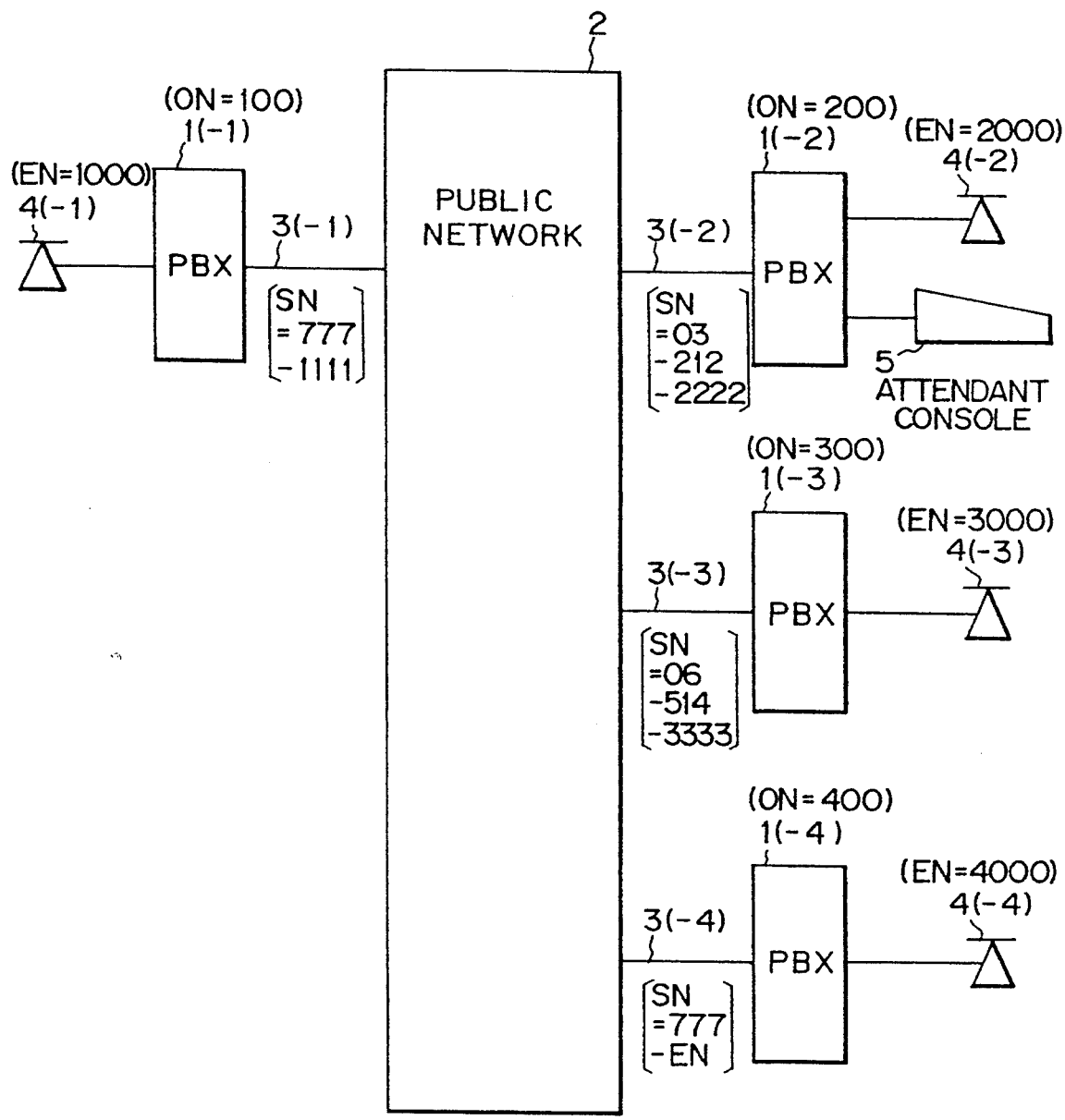
FIG. 3 is a block diagram of an embodiment of the virtual private network of the present invention.
Figure 4:
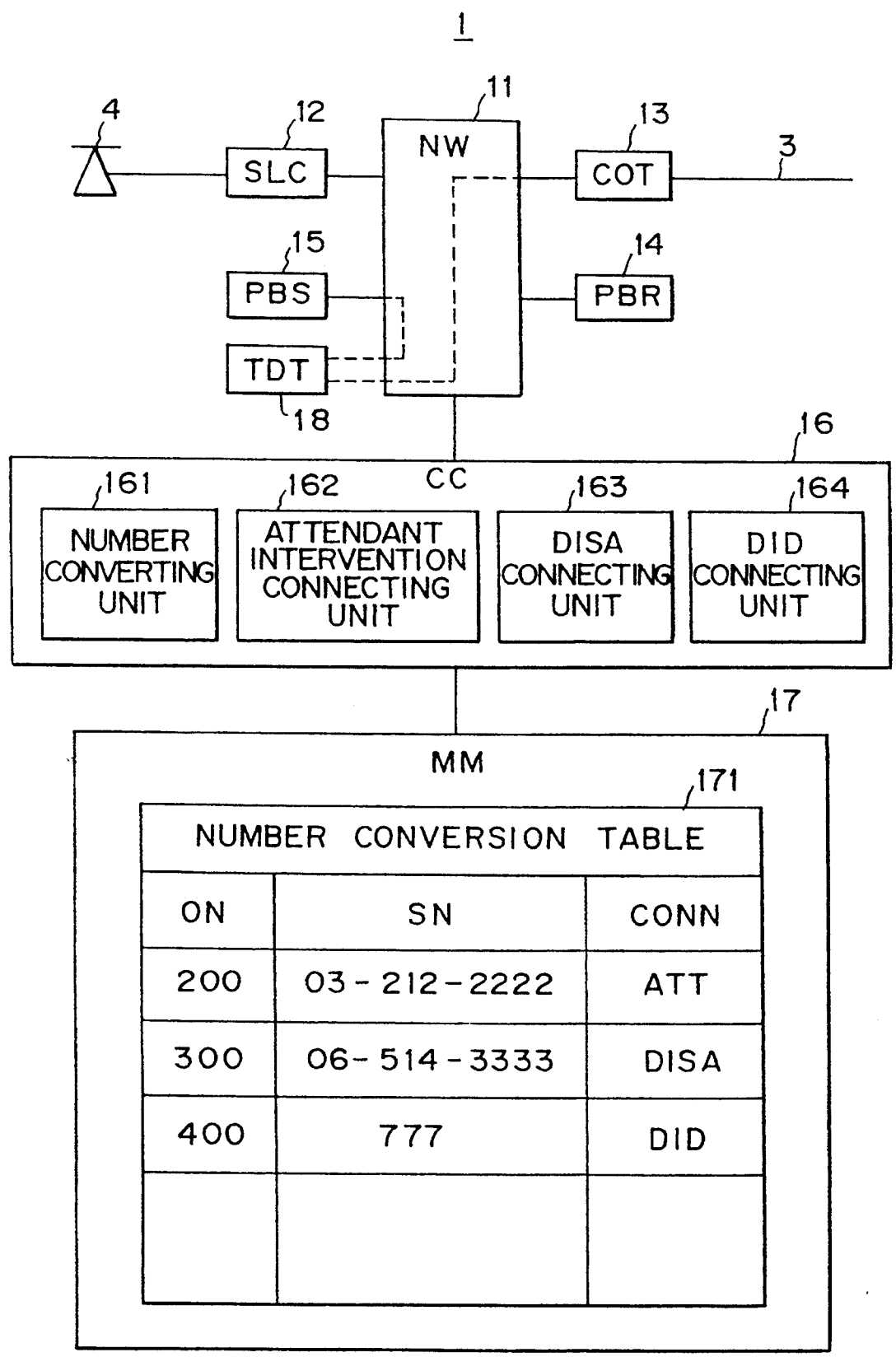
FIG. 4 is a block diagram of an embodiment of the PBX unit of the present invention.
Figure 5:
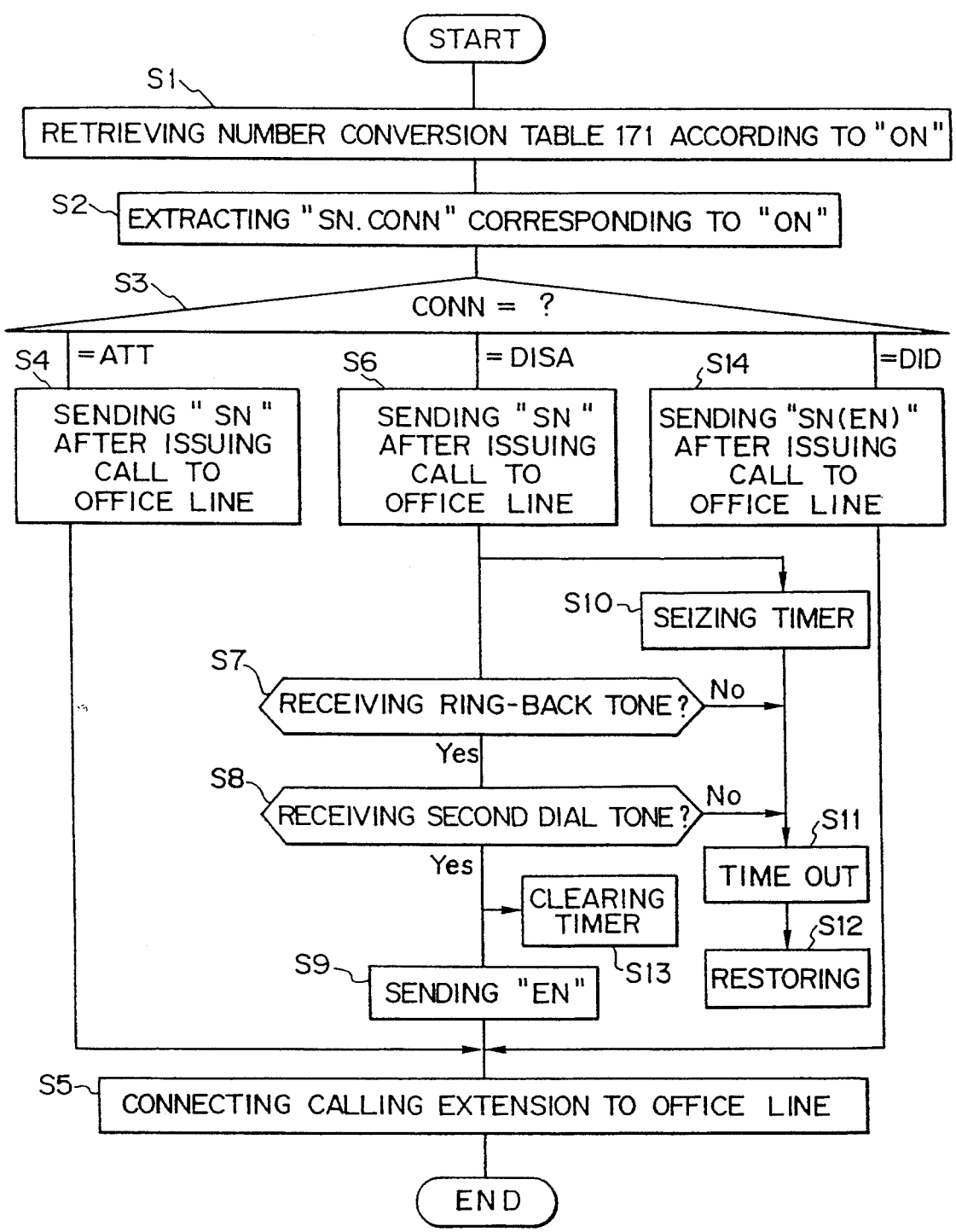
FIG. 5 is a flowchart for explaining the transmission process of the embodiment of the virtual private network shown in FIG. 3.
Figure 16:
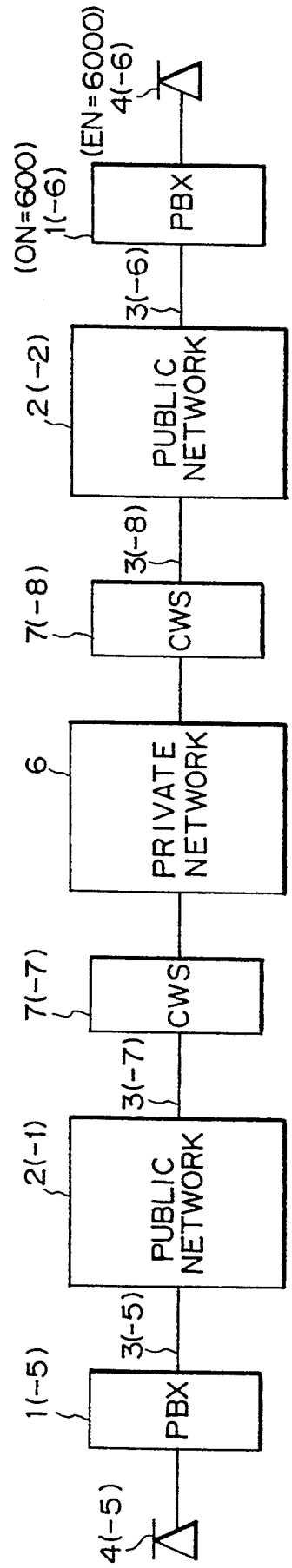
FIG. 16 is a block diagram for explaining another embodiment of the virtual private network related to the present invention.

FIG. 3 is a block diagram of an embodiment of the virtual private network of the present invention. FIG. 4 is a block diagram of an embodiment of the PBX unit of the present invention. FIG. 5 is a flowchart for explaining the connecting process of the embodiment of the virtual private network shown in FIG. 3. FIG. 16 is a block diagram for explaining another embodiment of the virtual private network related to the present invention. The same numbers refer to the same elements in all the figures.

In FIG. 3 four PBX units 1 are connected to the public network 2 through each office line assigned a unique subscriber number SN by the public network 2.

Each of the PBX units 1 forms a virtual private network and is assigned a unique private office number ON. For example, a PBX unit 1-1 is assigned a private office number ON=100; a PBX unit 1-2 is assigned a private office number ON=200; a PBX unit 1-3 is assigned a private office number ON=300; and a PBX unit 1-4 is assigned a private office number ON=400. However, the public network 2 is not provided with a special unit for offering a virtual private network service.

The PBX unit 1-2 is operated by an attendant intervention method (ATT) as a method for terminating a call from the public network 2 to the called extension. An attendant console 5 responds to a call issued by an office line 3-2 and connects it to the called extension 4.

After automatically responding to the received call issued by a subscriber line 3-3 according to the direct inward system access method (DISA) for terminating a call from the public network 2, the PBX unit 1-3 returns a second dial tone to the originating PBX and connects the call to the called extension 4 according to the called extension number EN transmitted through the public network 2.

The PBX unit 1-4 directly connects the call to the called extension 4 from the PBX unit 1 through the public network according to a direct dial-in method (DID) for terminating a call from the public network 2 in which the originating PBX unit 1 sends to the public network 2 a subscriber number SN assigned to the called extension 4. Lower digits in the subscriber number SN must match or correspond to the extension number EN assigned to the called extension 4.

As shown in FIG. 4, each of the PBX units 1 comprises, in a central controller (CC) 16, a number converting unit 161 as the number converter 100 shown in FIG. 2, and also comprises in a main memory (MM) 17, a number conversion table 171. Each PBX unit also comprises, in the central controller (CC) 16, an ATT connecting unit 162, a DISA connecting unit 163, and a DID connecting unit 164 as the outgoing call controller 200 shown in FIG. 2.

First, an extension 4-1 accommodated in the PBX unit 1-1 is connected to an extension 4-2 accommodated in the PBX unit 1-2 as follows.

As shown in FIGS. 3-5, the extension 4-1 issues a call and dials an identification number, 7 for example, for accessing the virtual private network service, and a private office number ON=200 of the destination PBX unit 1-2. In response to this, in the originating PBX unit 1-1, the central controller (CC) 16 detects the call issued by the extension 4-1 through a subscriber circuit (SLC), receives and analyzes the identification number 7 sent from the calling (or originating) extension 4-1 and the private office number ON=200 through a PB receiver (PBR) 14, and identifies the call as one issued in the virtual private network according to the identification number 7. Then, the number converting unit is activated.

The activated number converting unit 101 retrieves the number conversion table 171 provided in the main memory (MM) 17 according to the received private office number ON=200 (step S 1 in FIG. 5), and extracts a subscriber number SN=03-212-2222 stored corresponding to the private office number ON=200 and a terminating connection method CONN=an attendant intervention method ATT (step S 2).

Then, the number converting unit 161 analyzes the extracted terminating connection method CONN, and recognizes the attendant intervention method ATT (step S3). Thus, a corresponding ATT connecting unit 162 is activated.

The activated ATT connecting unit 162 selects/hunts a central office line trunk (COT) according to the procedure for connecting a call to the destination PBX unit 1-2 according to the attendant intervention method ATT. Then, after seizing a call to the public network through the office line 3-1, the ATT connecting unit 162 controls a network (NW) 11 to connect the outgoing office line trunk (COT) 13 to a PB sender (PBS) 15. Next, it sends from the PB sender (PBS) 15 the subscriber number SN=03-212-2222 extracted from the number conversion table 171 (step S 4), and controls the network (NW) 11 to connect the calling extension 4-1 to the outgoing office line 3 (step S 5).

On receiving the subscriber number SN=03-212-2222, the public network 2 hunts the office line connected to the destination PBX unit 1-2 according to the well-known procedure, and sends a ring-back tone (RBT).

When the PBX unit 1-2 operated in the attendant intervention method, an attendant answers a call from the office line 3-2 using the attendant console 5, and obtains a called extension number EN=2000 from the calling extension 4-1, the called extension 4-2 is called in the well-known procedures. If the called extension 4-2 responds to this, it is connected to the incoming office line 3-2.

As described above, the calling extension 4-1 and the called extension 4-2 are allowed to communicate with each other.

Next, the extension 4-1 accommodated in the PBX unit 1-1 issues a call to the extension 4-3 accommodated in the PBX unit 1-3 as follows.

In FIGS. 3–5, the extension 4-1 issues a call and dials an identification number 7 for accessing the virtual private network service, a private office number ON=300 of the destinating PBX unit 1-3, and an extension EN=3000 of the called extension 4-3. In response to this, in the calling PBX unit 1-1, the central controller (CC) 16 detects the call issued by the extension 4-1, receives and analyzes the identification number 7 sent from the calling extension 4-1, the private office number ON=300, and the extension number EN=3000, and recognizes according to the identification number 7 that the call is issued in the virtual private network. Thus, the number converting unit 161 can be activated.

As described above, the activated number converting unit 161 retrieves the number conversion table 171 provided in the main memory (MM) 17 according to the received private office number ON=300 (step S 1 in FIG. 5), and extracts a subscriber number SN=06-514-3333 stored corresponding to the private office number ON=300 and a terminating connection method CONN=direct inward system access DISA method (step S 2).

Then, the number converting unit 161 analyzes the extracted terminating connection method CONN, identifies the DISA (step S 3), and activates the DISA connecting unit 163.

The activated DISA connecting unit 163 hunts the office line trunk (COT) 13 according to the procedure for connection to the destination PBX unit 1-3 using the DISA method. After seizing a call to the public network 2 through the office line 3-1, the DISA connecting unit 163 connects the outgoing central office line trunk (COT) 13 to the PB sender (PBS) 15, and sends from the PB sender (PBS) 15 the subscriber number SN=06-514-3333 extracted from the number conversion table 171 (step S 6).

After receiving the subscriber number SN=06-514-3333, the public network 2 selects and hunts the office line 3-3 connected to the destination PBX unit 1-3 according to the well-known procedure, sends a ringing signal to the destination PBX unit 1-3, and returns the ring-back tone to the calling PBX unit 1-1.

After responding to the call received through the office line 3-3, the PBX unit 1-3 operated in the DISA prepares for receiving a called extension number EN, and returning a second dial tone to the incoming office line 3-3.

In the calling PBX unit 1-1, the DISA connecting unit 163 recognizes the call progress with the aid of a tone detector trunk (TDT) described in below. Then, the calling PBX unit 1-1 sends from the PB sender (PBS) 15 a called extension number EN=3000 received from the calling extension 4-1 (step S 9), and controls the network (NW) 11 to connect the calling extension 4-1 to the office line 3 (step S 5).

As shown in FIG. 4, a ring-back tone returned from the public network 2 and a second dial tone returned from the called PBX unit 1-3 are detected by a tone detector trunk (TDT) 18 connected to the central office line trunk (COT) 13 through the path represented by the broken lines. The path is used only for the DISA connecting system.

In FIG. 5, the returned ring-back tone is monitored in S 7 and the returned second dial tone is monitored in S 8. After the subscriber number SN is sent to the public network 2 in S 6, a timer for monitoring the answer from the public network and the destination PBX unit 1-3 is activated in S 10. If the timer indicates a timeout in S 11 before the ring-back tone and the second dial are returned, the office line 3-1 and the calling extension 4-1, etc. are restored in S 12. If the ring-back tone and the second dial tone are returned before the timeout, the timer is cleared in S 13.

When the public network 2 transmits the called extension number EN=3000 received from the calling PBX unit 1-1 to the called PBX unit 1-3 according to the well-known procedure, the called PBX unit which received the called extension number EN=3000 calls the called extension 4-3 according to the well-known procedure, and connects the called extension incoming office line 3-3 when it is picked up.

Thus, the calling extension 4-1 and the called extension 4-3 are allowed to communicate with each other.

Next, the extension 4-1 accommodated in the PBX unit 1-1 is received by the extension 4-4 accommodated in the PBX unit 1-4 as follows:

In FIGS. 3–5, the extension 4-1 issues a call and dials an identification number 7 for use in sending a call in the virtual private network, a private office number ON=400 of the destination PBX unit 1-4, and an extension EN=4000 of the called extension 4-4. In response to this, in the originating PBX unit 1-1, the central controller (CC) 16 detects the call issued by the extension 4-1, receives and analyzes the identification number 7 sent from the calling extension 4-1, the private office number ON=400, and the extension number EN=4000, and recognizes according to the identification number 7 that the call is issued in the virtual private network. Thus, the number converting unit 161 can be activated.

As described above, the activated number converting unit 161 retrieves the number conversion table 171 provided in the main memory (MM) 17 according to the received private office number ON=400 (step S 1 in FIG. 5), and extracts a subscriber number SN=777 stored corresponding to the private office number ON=400 and a terminating connection method CONN=direct dial-in system DID (step S 2). The extracted SN refers to the number up to the local code in a telephone number. For example, an area code is extracted when it is stored.

Then, the number converting unit 161 analyzes the extracted terminating connection method CONN, identifies the direct dial-in system DID (step S and activates the DID connecting unit 164.

The activated DID connecting unit 164 hunts the office line trunk (COT) 13 according to the procedure for connection to the destination PBX unit 1-4 using the direct dial-in system DID. After seizing a call to the public network 2 through the office line 3-1, the DID connecting unit 164 connects the outgoing office line trunk (COT) 13 to the PB sender (PBS) 15, inserts a called extension number=4000 received from the calling extension 4-1 into the subscriber number SN=777 extracted from the number conversion table 171, sends them from the PB sender (PBS) 15 (step S 10), and controls the network (NW) 11 to connect the calling extension 4-1 to the outgoing office line 3 (step S 5).

On receiving the subscriber number SN=777-4000, the public network 2 identifies that the destination PBX unit 1-4 uses the direct dial-in system DID, hunts the office line 3-4 connected to the destination PBX unit 1-4 according to the well-known procedure, and o transmits to the destination PBX unit 1-4 four less significant digits=4000 in the subscriber number SN=777-4000 received from the calling PBX unit 1-1.

On receiving the called extension number EN=4000 from the office line 3-4, the PBX unit 1-4 operated in the direct dial-in system DID hunts the called extension 4-4 according to the well-known procedure, and connects it to the incoming office line 3-4 on answering.

Thus, the calling extension 4-1 and the called extension 4-4 are allowed to communicate with each other.

Figure 6:
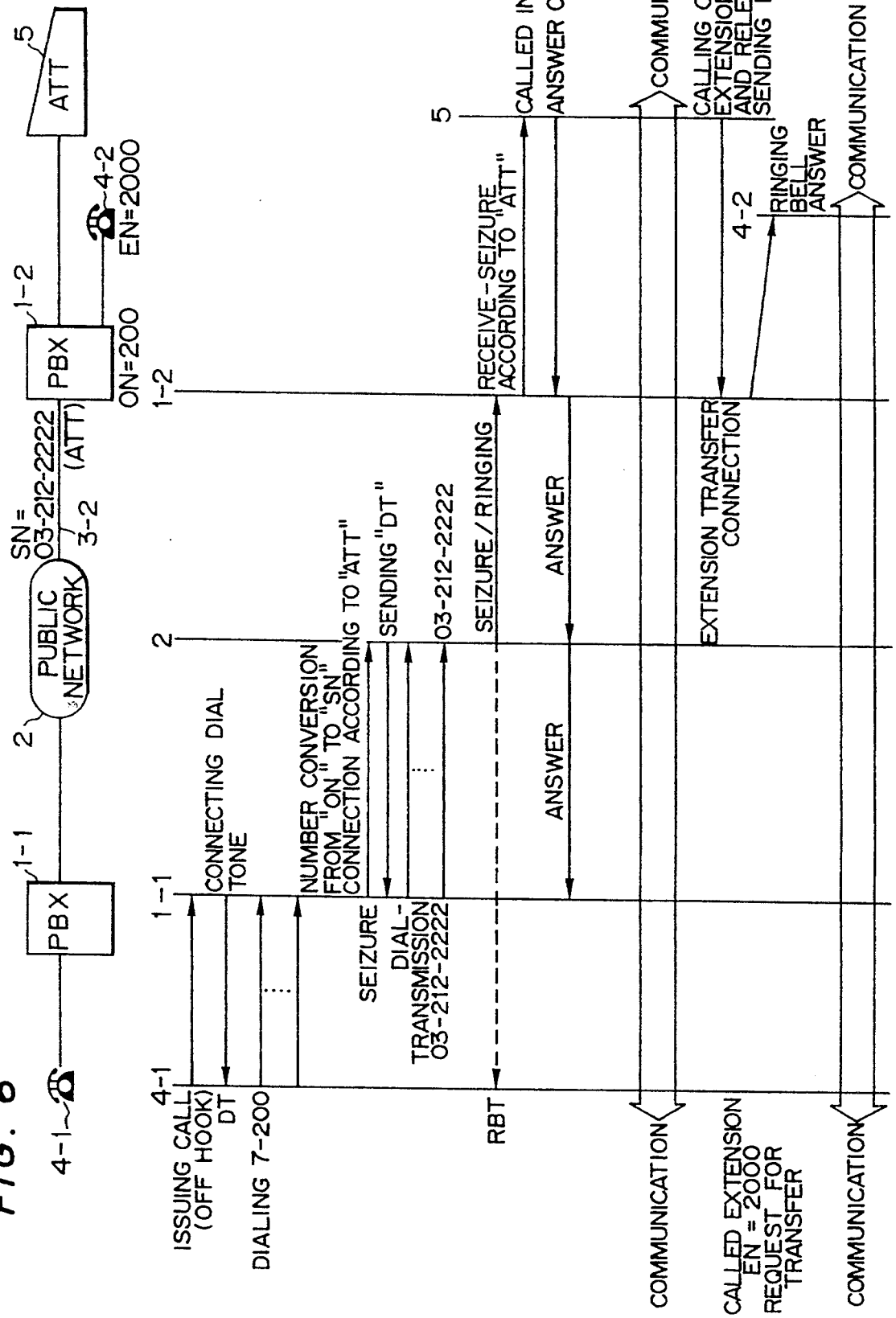
FIG. 6 shows a connection sequence in the terminating connection method using an attendant intervention.
Figure 7:
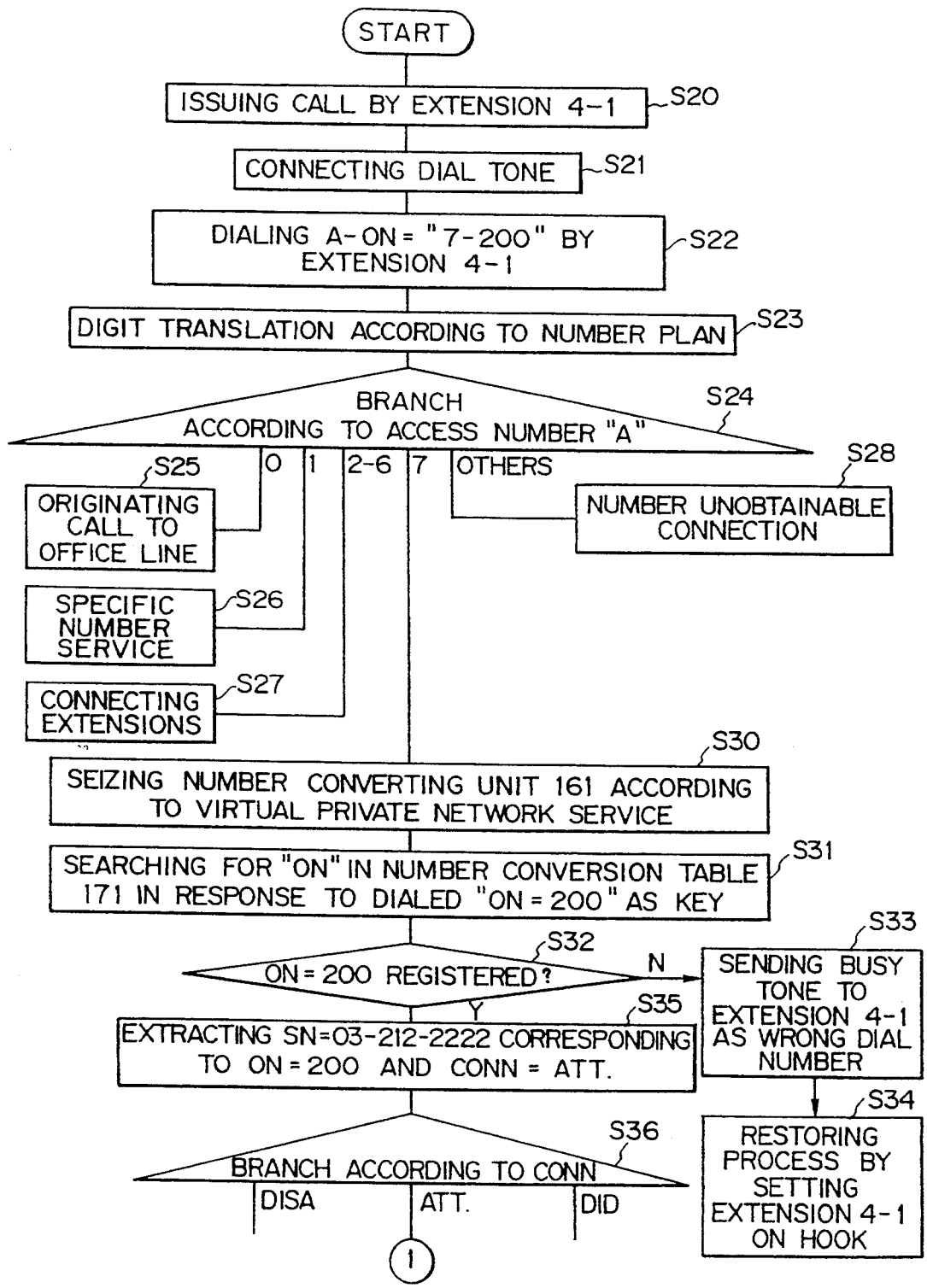
FIG. 7 is a first part of the flowchart for explaining the connection process of the terminating connection method using an attendant intervention.
Figure 8:
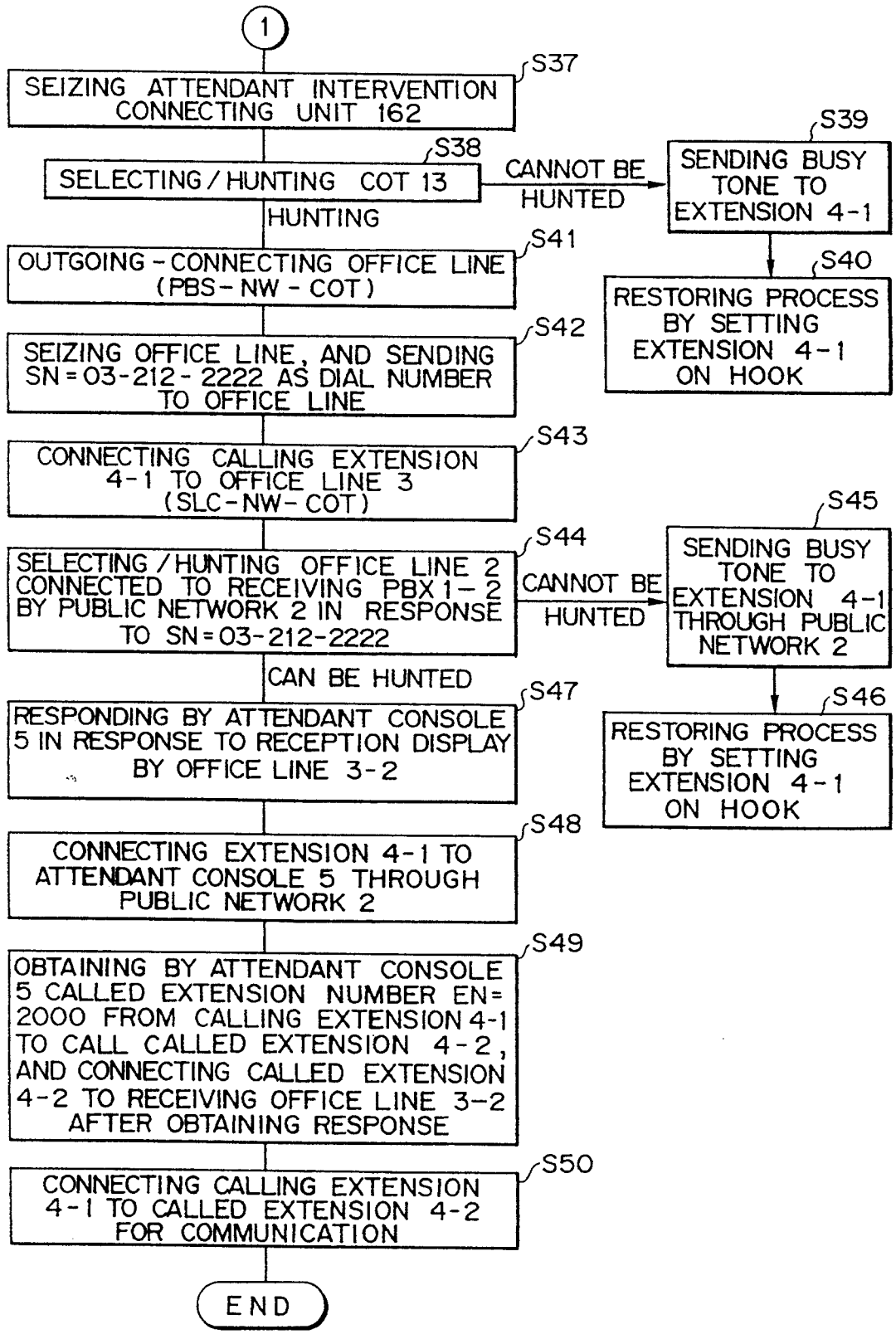
FIG. 8 is a second part of the flowchart for explaining the connection process of the terminating connection method using an attendant intervention.

Sequences and flowcharts of the virtual private network connecting system of the present invention are separately explained in detail for the attendant intervention method (ATT), the added number dial-in system (DISA), and the direct dial-in system (DID). FIG. 6 shows a connection sequence in the attendant intervention method. FIGS. 7 and 8 are flowcharts for explaining the connection process of the attendant intervention method. In FIG. 6, when the extension 4-1 accommodated in a calling PBX 1-1 issues a call, a dial tone (DT) is connected by the calling PBX 1-1 in S (step) 21 in response to the issue of the call in S 20 shown in FIG. 7. The extension 4-1 dials 7 indicating an access number A and 200 indicating a private office number ON in S 22, and analyzes the dialed numbers according to a predetermined number plan in S 23. First, in S 24, a branch is made by the access number A. When the access number A is "0", a call is directly connected to public network in S 25. When it is "1", a specific number service is provided. When it is one of "2"-"6", extensions are mutually connected. For example, when it is "8" or "9", an idle numbers are connected in S 28.

When the access number A is "7", which refers to an identification number for use in sending a call in the virtual private network as described above, the number converting unit 161 is activated in S 30 to send a call in the virtual private network. In S 31, the number conversion table 171 is retrieved according to the dialed private office number ON=200. In S 32, determination is made as to whether or not the private office number (ON) is registered. If not, a busy tone is sent to the extension 4-1 as a wrong dial in S 33, and the process is restored by setting the extension 4-1 on the hook in S 34.

When the private office number ON=200 is determined to be registered in S 32, the subscriber number (SN) corresponding to the private office number and the terminating connection system (CONN) are extracted in S 35, and a branch is made by the terminating connection method in S 36. The processes in S 31–S 36 are performed mainly by the number converting unit 161.

Since the terminating connection method indicates "ATT" in S 36, the ATT connecting unit 162 is activated in S 39 shown in FIG. 8, and the following processes are controlled by the ATT connecting unit 162. In FIG. 6, the public network (PSTN) 2 is activated by the calling PBX 1-1. First, in S 38, the office line trunk (COT) 13 is hunted. If it cannot be hunted, a busy tone is sent to the extension 4-1 in S 39, and the process is restored by setting the extension 4-1 on the hook in S 40.

When the office line trunk is hunted in S 38, an office line outgoing connection is made in S 41, and the PBS 15 and the COT 13 are connected as shown in FIG. 4. Then, in S 42, an office line is activated, the subscriber number SN=03-212-2222 is sent as a dial number. In S 43, the extension 4-1 and the office line 3 are connected through the SLC 12, NW 11, and COT 13.

Then, in FIG. 6, the public network (PSTN) 2 starts activating and calling the called PBX 1-2. That is, in S 44 shown in FIG. 8, the public network 2 selects and captures the office line 3-2 connected to the called PBX 1-2 according to the receiving subscriber number. When the number cannot be obtainable, a busy tone is sent to the calling extension 4-1, and the process is restored by setting the extension 4-1 on the hook in S 46.

Figure 9:
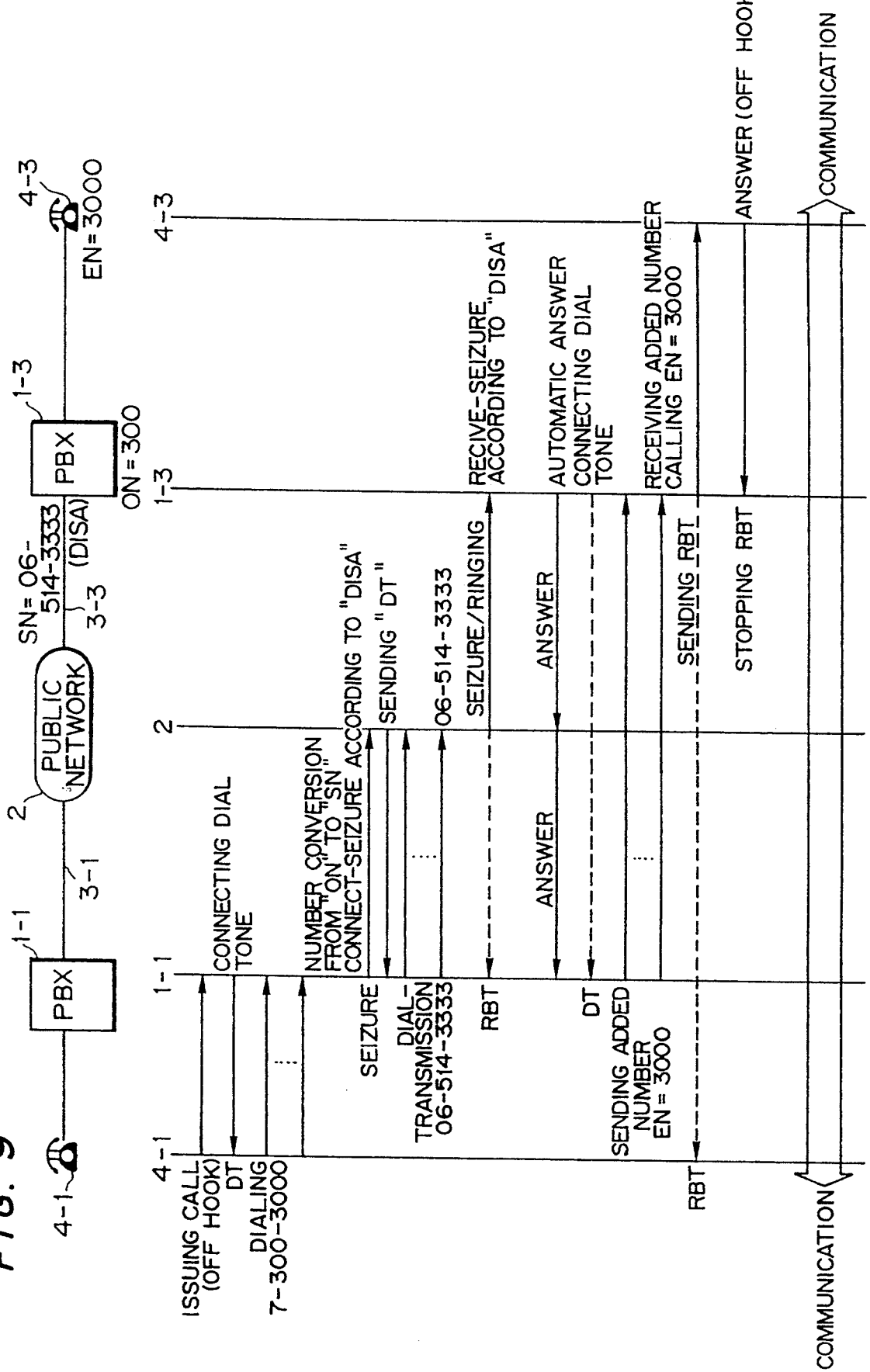
FIG. 9 shows a connection sequence in the DISA terminating connection method.
Figure 10:
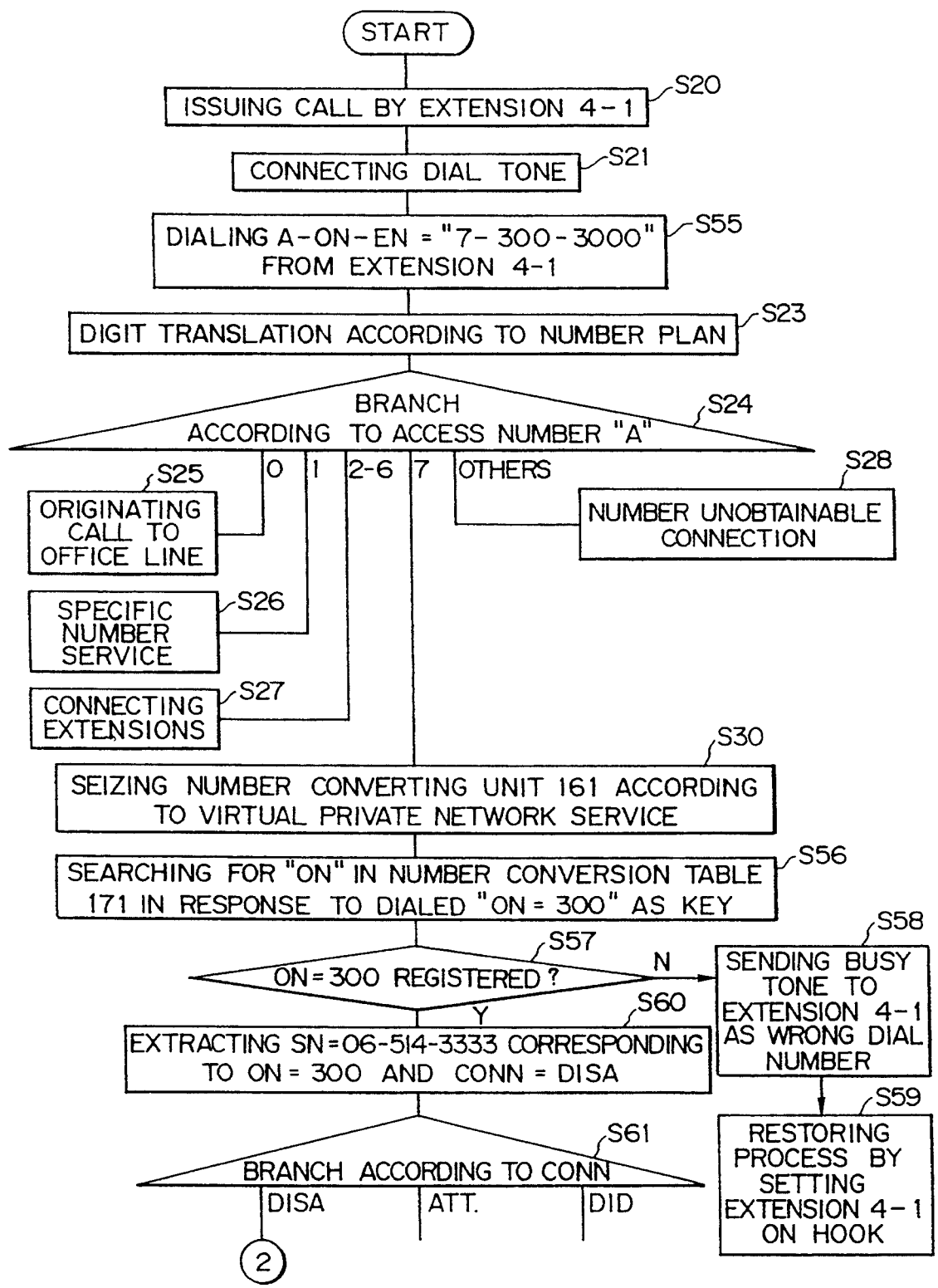
FIG. 10 is a second part of the flowchart for explaining the connecting process in the DISA terminating connection method.
Figure 11:
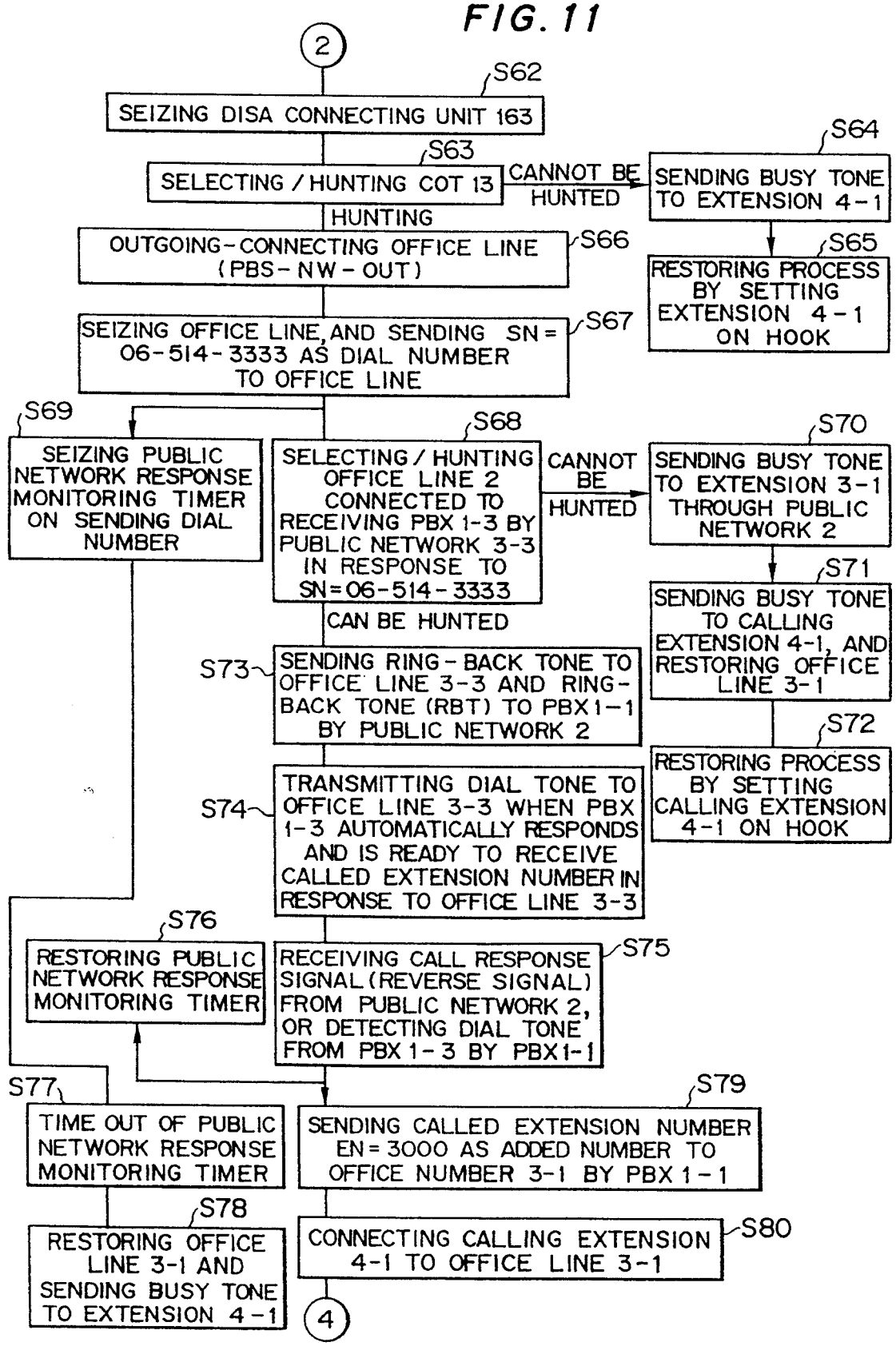
FIG. 11 is a second part of the flowchart for explaining the connecting process in the DISA terminating connection method.
Figure 12:
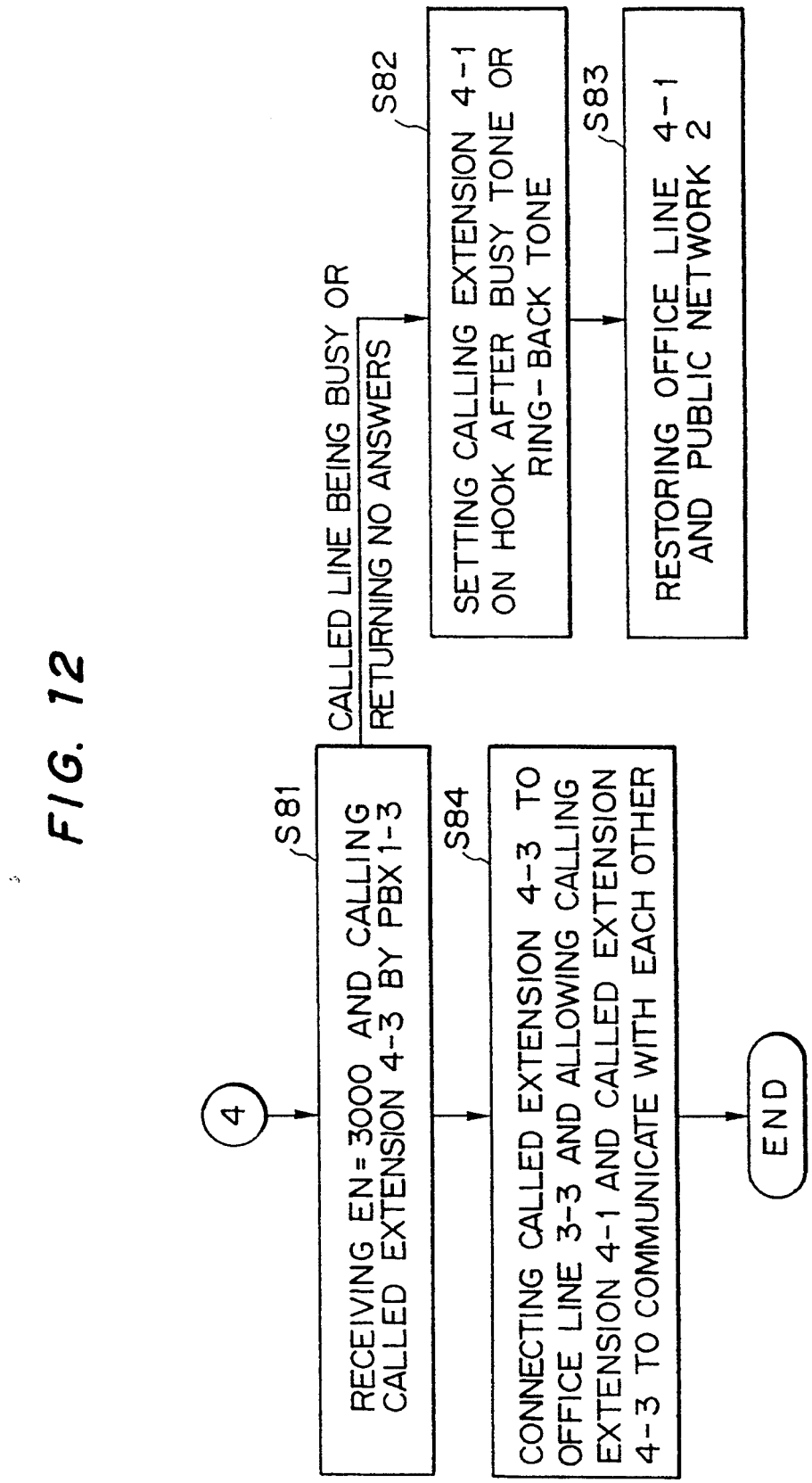
FIG. 12 is a third part of the flowchart for explaining the connecting process in the DISA terminating connection method.

When the office line 3-2 is captured in S 44, an incoming call is displayed on the attendant console 5 in S 47, and the attendant console 5 answers the call. In S 48, the answer is made by connecting the calling extension 4-1 to the attendant console 5 through the public network 2. In S 49, the attendant console 5 obtains the called extension number EN=2000 from the called extension 4-1, calls the called extension 4-2 by ringing a bell as shown in FIG. 6, and connects after a response the called extension 4-2 to the incoming office line 3-2. In S 50, the calling extension 4-1 and the called extension 4-2 are allowed to communicate with each other, and actual communication is made between them, thus performing the process. FIG. 9 shows a connection sequence in the DISA connecting system. FIGS. 10–12 are flowcharts for explaining the connecting process in the DISA connecting system. The extension 4-1 accommodated in the calling PBX 1-1 is connected to the extension 4-3 accommodated in the called PBX operated in the DISA connecting system as follows.

First, when the calling extension 4-1 issues a call in S 20 shown in FIG. 10 after setting the line off the hook, a dial-tone connection is made like in FIG. 7 by the PBX 1-1 shown in FIG. 9, the processes shown in FIG. 7 are performed from S 21 to S 30, and the number converting unit 161 is activated in S 30. The difference resides in the dial number. That is, in comparison with S 22 in FIG. 7, the dial number indicated in S 55 shown in FIG. 10 comprises "7" as an access number A, "300" as a private office number ON, and "3000" as a called extension number EN.

When the number converting unit 161 is activated in S 30, The number conversion table 171 is retrieved according to the private office number ON in S 56, determination is made as to whether or not the private office number 300 is registered in S 57. If not, a busy tone indicating a wrong number is sent to the extension 4-1 in S 58, and the process is restored in S 59 by setting the extension 4-1 on the hook.

When the private office number is determined to be registered in S 57, the subscriber number (SN) corresponding to the private office number and the terminating connection method (CONN) are extracted in S 60, and a branch is made by the terminating connection method CONN in S 61.

Since the connecting system DISA is indicated in S 61, the DISA connecting unit 163 is activated in S 2 shown in FIG. 11, and the following processes are controlled by the DISA connecting unit 163. In S the office line trunk (COT) 13 is hunted. When it cannot be hunted, a busy tone is sent to the extension 4-1 in S 64, and the process is restored by setting the extension 4-1 on the hook in S 65. When the office line trunk is hunted in S 03, an outgoing connection is made in S 66, a receiving subscriber number is sent to an office line as a dial number in 67, the office number 3-3 connected to the called PBX 1-3 is selected and captured by the public network according to the subscriber number 06-514-3333 in 68, and a public network response monitoring timer is activated in S 69. That is, in FIG. 9, the calling PBX 1-1 sets the maximum time for confirming a response from the called PBX 1-3 from the time point at which it sends to the public network 2 a receiving subscriber number as a dial number, and monitors whether or not a response is made within the maximum time period.

When the public network 2 shown in FIG. 9 captures the office line 3-3 in S 68; the public network 2 activates and calls the office line 3-3 and sends a calling tone (ring-back tone) RBT to the RBX 1-1 in S 73; the called PBX 1-3 automatically answers the call, get ready for receiving a called extension number, and raising a second dial tone (DT) to the office line 3-3 in S 74; the calling PBX 1-1 acknowledges the answer from the called PBX 1-3 by receiving the second dial tone or a reverse signal from the public network 2. When the answer is acknowledged, the public network response monitoring timer activated in S 69 is cleared in S 76. When the public network response monitoring timer is timed out in S 77 before a second dial tone from the called PBX 1-3 is detected in S 75, the office line 3-1 is restored in S 78, and a busy tone is sent to the extension 4-1.

When a second dial tone from the PBX 1-3 is detected in S 75, the calling PBX 1-1 sends the office line 3-1 the called extension number EN=3000 as an added number in S 79 as shown in FIG. 9, and the calling extension 4-1 is connected to the office line 3-1 in S 80.

In response to this, the called PBX 1-3 receives the EN=3000 as an added number (shown in FIG. 9) in S 81 as shown in FIG. 12, and calls the called extension 4-3. If the extension is busy or does not respond, it is set on the hook by the calling extension 4-1 in S 83, the calling extension 4-1 and the public network 2 are restored in S 83. When the called line responds to the call in S 81, the called extension 4-2 is connected to the office line 3-3 in S 84, and the calling extension 4-1 and the called extension 4-3 are allowed to communicate with each other, and the process is thus terminated.

Figure 13:
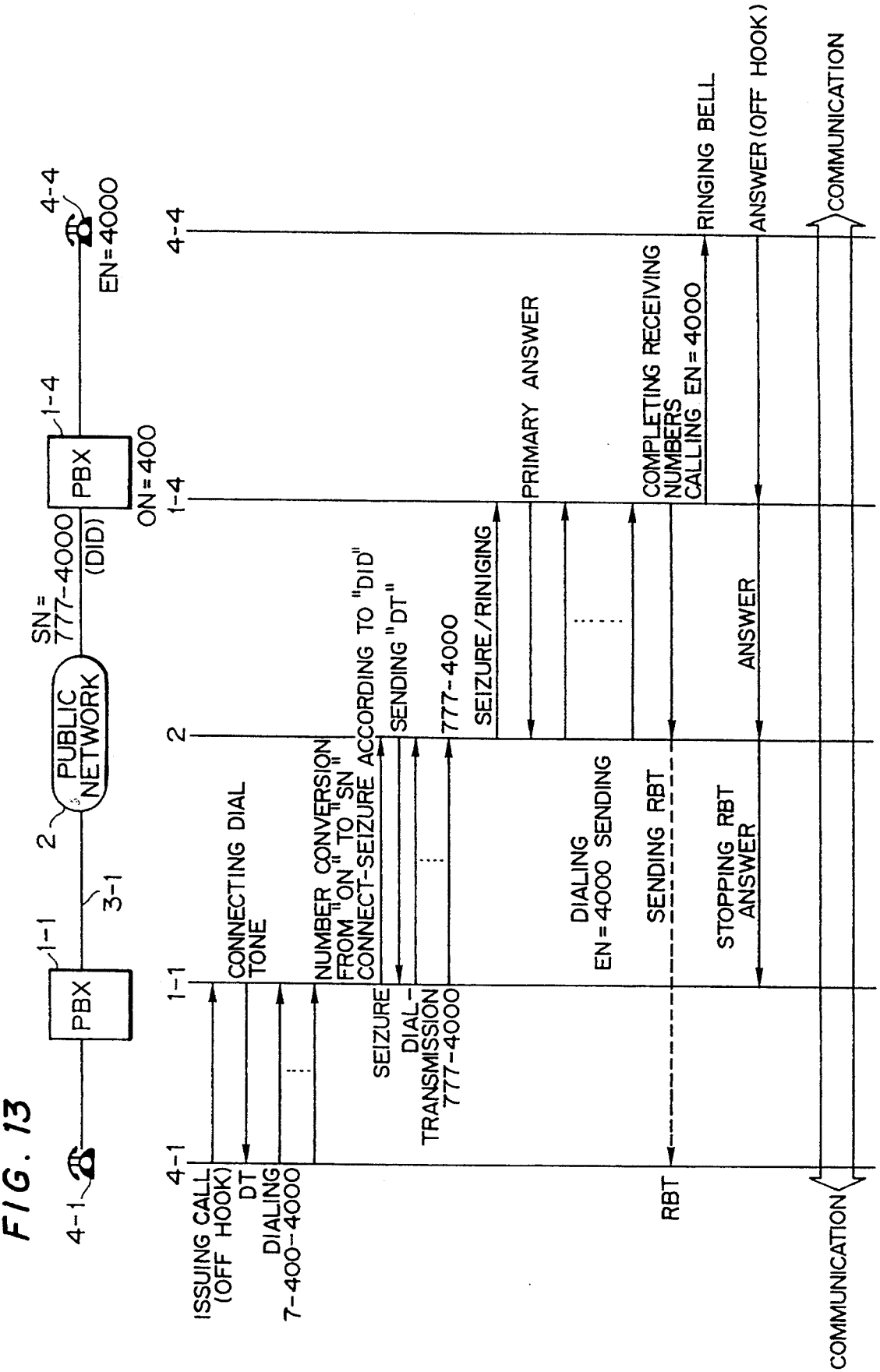
FIG. 13 shows a connection sequence in the DID terminating connection method.
Figure 14:
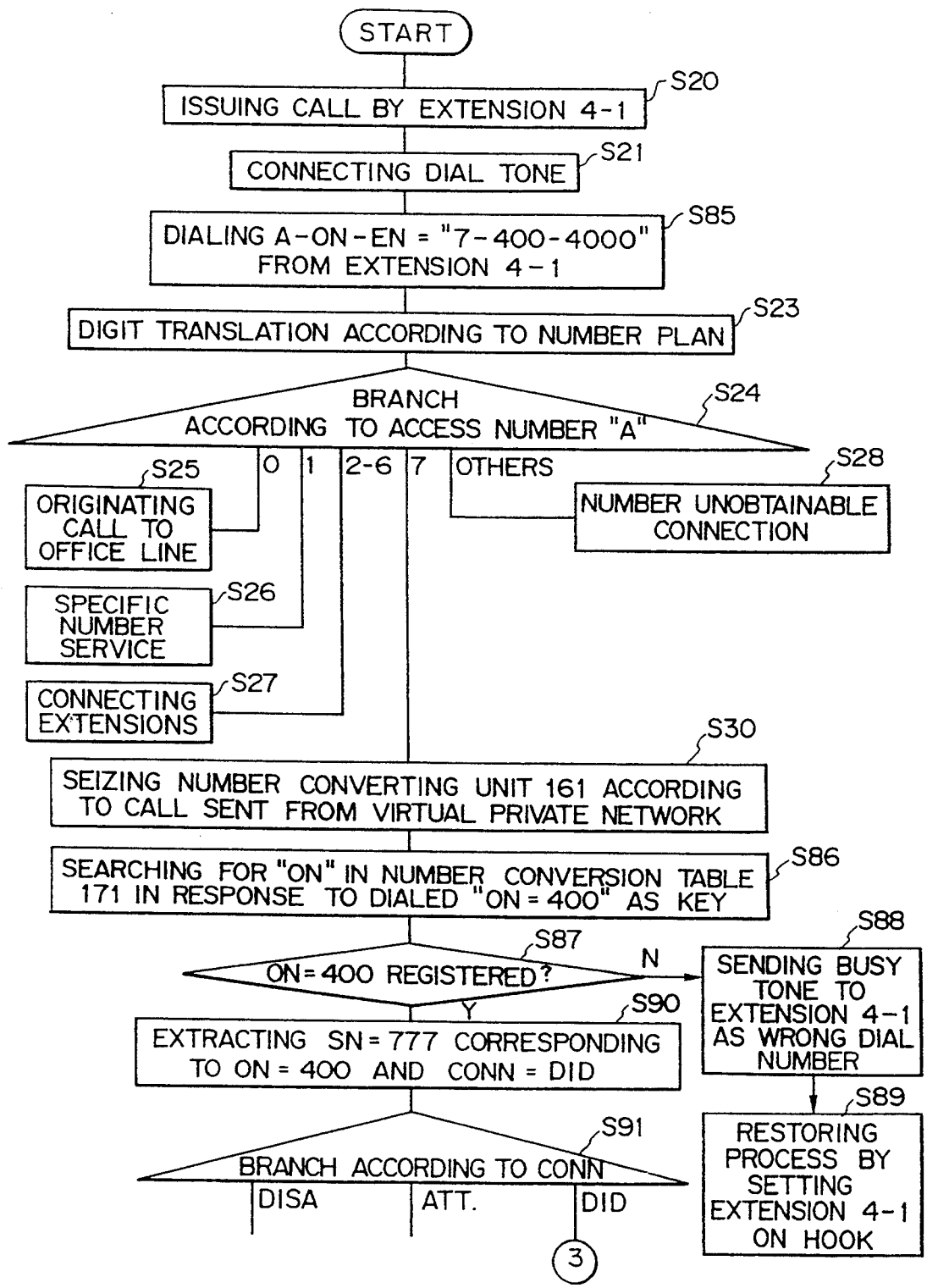
FIG. 14 is a second part of the flowchart for explaining the connecting process in the DID terminating connection method.
Figure 15:
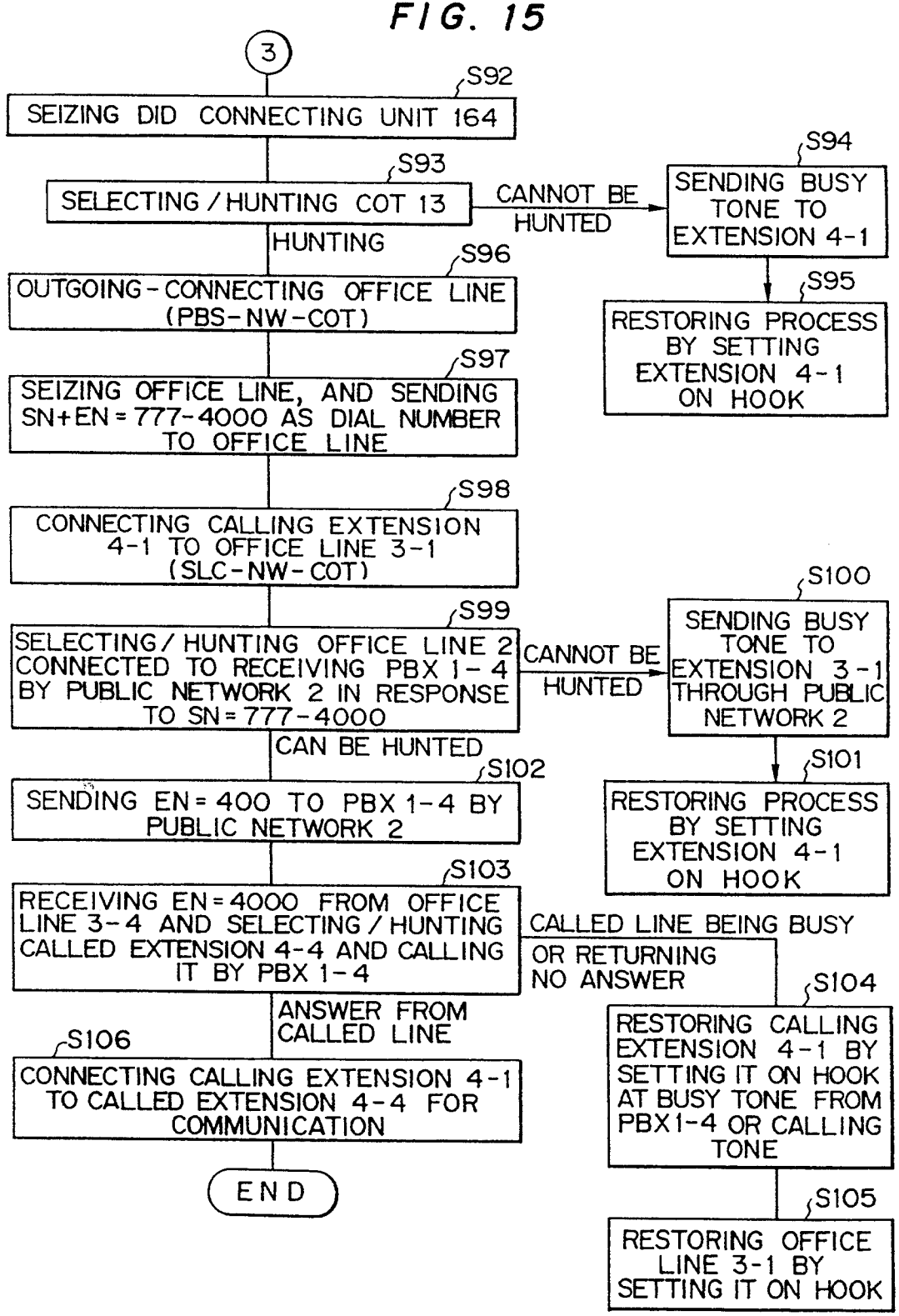
FIG. 15 is a second part of the flowchart for explaining the connecting process in the DID terminating connection method.

FIG. 13 shows a connection sequence in the DID connecting system. FIGS. 14 and 15 are flowcharts for explaining the connecting process in the DID connecting system. The connecting system is explained by pointing out the differences from the DISA connecting system explained associated with FIGS. 9–12.

First, in the connection sequence shown in FIG. 13, the dial number 06-514-3333 is sent from the calling PBX 1-1 to the public network 2 in the connection sequence of the DISA connecting system shown in FIG. 9. Then, after an automatic response from the called PBX 1-3, the PBX 1-1 sends the called extension number EN=3000 as an added number, and the called extension is called. By contrast, in FIG. 13, after the private office number 400 dialed by the calling extension 4-1 is converted to the office number 777 of the public network, the called extension number 4000 dialed by the calling extension 4-1 is added to 777 above, thus forming a number 777-4000, and is sent from the calling PBX 1-1 to the public network (PSTN). Then, the called extension 4-4 is immediately called by the called PBX 1-4. The actual extension number of the called extension 4-4 accommodated in the called PBX 1-4 does not always indicate 4000 sent from the sender. When it doesn't, a 1:1 correspondence is retained between "4000" and the subscriber number.

In FIG. 14, the processes up to S 30 in which the number converting unit 161 is activated are almost the same as those shown in FIG. 10. However, in S 85, unlike S 55 in FIG. 10, the office number "400" of the PBX accommodating a called extension as a private office number ON and the extension number EN "4000" are dialed.

The processes in S 86–S 91 performed by the number converting unit 161 are almost the same as those in S 56–S 61 in FIG. 10. However, the number conversion table 171 is retrieved according to the private office number ON=400 in S 86, and determination is made as to whether or not the number is registered in S 87, the office number 777 of the public network is extracted as a subscriber number SN in S 90 for the above number, and the DID is extracted as the CONN.

When the DID connecting unit 164 is activated in S 92 shown in FIG. 15 by the branch in S 91 shown in FIG. 14 according to the connection system CONN, the processes in S 62–S 67 shown in FIG. 11 are the same as the processes up to S 97. However, in S 97, the EN=4000 corresponding to the actual subscriber number is added to the office number 777 of the public network retrieved by the number conversion table 171, and sent as a dial number. If, for example, the number "7-400-4001" is dialed from the calling extension 4-1, the dial number to be sent in S 97 is "777-4001".

The processes in and following S 98 are fundamentally similar to those performed in receiving a call by an attendant console. First, in S 98, the calling extension 4-1 is connected to the office line 3-1, like in S 43 in FIG. 8, and the office line is captured by the public network 2 in S 99 like in S 44. When it is not captured, the process is restored in S 100 and S 101 like in S 45 and S 46.

When the office line 3-4 is captured in S 99, the extension number EN=4000 is transmitted from the public network 2 to the PBX 1-4 in S 102, and the called extension 4-4 is selected, captured, and called by the called PBX 1-4 in S 103. When the called line is busy or does not respond, the calling extension 4-1 is set on the hook in S 104, and the office line is restored in S 105. If the called line responds to the call in S 103, the calling extension 4-1 and the called extension 4-4 are allowed to communicate with each other in S 106, and the process is thus terminated. The processes S 93–S 106 are performed under control of the DID connecting unit 164.

FIG. 16 shows another embodiment of the virtual private network. In FIG. 16, unlike in FIG. 3, the PBX unit does not connect lines only through a public network, but connects lines through, example, a public network 2-1 for intra-city-A communication, a public network 2-2 for intra-city-B, and a private network 6 as a long-distance communication line between City A and City B.

FIGS. 3–5 show embodiments of the present invention. Therefore, it is obvious that the present invention is not limited to these embodiments. For example, the number converter 100 and the outgoing call controller 200 are not limited to the number converting unit 161, the attendant intervention connecting unit 162, the DISA connecting unit 163, or the DID connecting unit 164, but some other variations can be available. In any unit, the present invention works sufficiently. Each of the PBX units 1 forming the virtual private network is not always connected only through the public network 2. Actually, as shown in FIG. 16, the public network 2 is used only for the local (intra-city) communication (2-1 and 2-2), and a leased private network 6 is used for the long-distance communication. The present invention works effectively in any of these networks.

In FIG. 16, when an extension 4-5 accommodated in a PBX unit 1-5 issues a call, and dials an identification number "7" for use in sending a call in the virtual network, a private office number ON=600 of a called PBX unit 1-6, and a called extension number EN=6000, the calling PBX unit 1-5, like the PBX unit 1-1 shown in FIG. 3, converts using the number converter 100 and the outgoing call controller 200 the private office number ON=600 to a number applicable to the public network 2-1 in order to connect the private office number ON =600 to the called PBX unit 1-6 through a gateway switching unit (GWS) 7-7 and the private network 6, and then sends the converted number to the public network 2-1 by outgoing connection of the office line The public network 2-1 connects the calling PBX 1-5 to a gateway switching unit (GWS) 7-7 according to the well-known procedure, and transmits to the gateway switching unit (GWS) 7-7, a number sent from the sending PBX unit 1-5 which detected a response of the gateway switching unit (GWS) 7-7 (for example, a send identification number ID for confirming the calling PBX unit 1-5's right to use the private network 6, the private office number ON=600 of the called PBX unit 1-6, and the called extension number EN=6000).

The gateway switching unit (GWS) 7-7 is connected to a gateway switching unit (GWS) 7-8 through the private network 6 according to the well-known procedure based on the received number, and sends the private office number ON=600 and the extension number EN=6000.

The gateway switching unit (GWS) 7-8 converts, like the PBX unit 1-1 shown in FIG. 3, the received private office number ON=600 to the applicable subscriber number SN according to the number converter 100 and the outgoing call controller 200 in order to connect the number to the PBX unit 1-6 by the public network. Then, the number is connected to the called PBX unit 1-6 through the public network 2-2, and calls the called extension 4-6 according to the receive-connecting system CONN used by a PBX unit 1-6.

Figure 17:
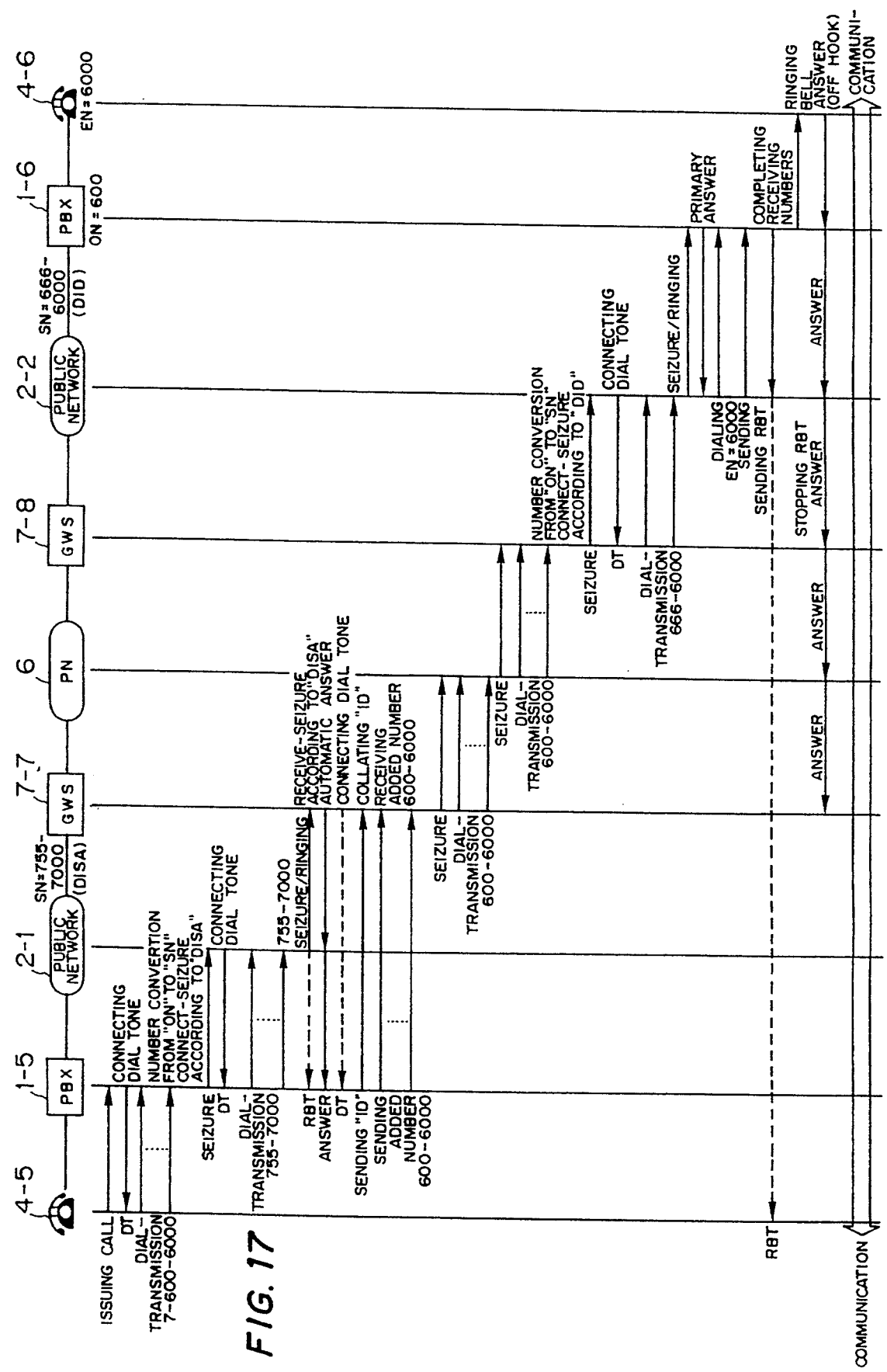
FIG. 17 shows a connection sequence in the virtual private network shown in FIG. 16.

FIG. 17 shows a connection sequence in the virtual private network shown in FIG. 16. The connection sequence is explained assuming that the gateway switching unit (GWS) 7-7 accommodated in the sending public network 2-1 is operated according to the added number dial-in (DISA) system, and the receiving PBX 1-6 is operated according to the direct dial-in (DID) connecting system.

In FIG. 17, when the calling extension 4-5 dials the identification number 7 for use in sending a call in a private network, the private office line ON=600 corresponding to the called PBX 1-6, and the called extension number EN=6000, the calling PBX 1-5 converts the numbers, and the subscriber number 755-7000 of the gateway switching unit (GWS) 7-7 in the public network (PSTN) 2-1 is sent as a dial number to the public network 2-1. After an automatic response from the gateway switching unit 7-7, the DISA connecting system sends from the PBX 1-5 to the gateway switching unit 7-7 the private office number 600 and the receiving extension number 6000 of the receiving PBX 1-6 as an added number.

The gateway switching unit 7-7 transmits the private office number 600 and the called extension number 6000 of the called PBX 1-6 to the gateway switching unit 7-8 accommodated in the receiving public network 2-2 through a private network (PN) 6 exclusively used as a long-distance communication line.

Since the called PBX 1-6 is operated in the DID connecting system, the gateway switching unit 7-8 retrieves an office number 666 in the public network 2-2 according to the number conversion table, sends a dial number to the public network 2-2 after adding the extension number 6000 of the called extension to the end of the office number, the receiving extension 4-6 is called by the receiving PBX 1-6 according to the DID connecting system, and the calling extension 4-5 and the called extension 4-6 are allowed to communicate with each other.

As described above, in the present invention, the extension 4-1 shown in FIG. 3, for example, dials the identification number 7 for use in sending a call in the virtual private network, a private office number ON of the destination PBX unit 1, and a called extension number EN as necessary. In response to this, the number converting unit 161 of the calling PBX unit 1-1 retrieves the number conversion table 171, and extracts a subscriber number SN corresponding to the private office number ON and a terminating connection method CONN. Then, the ATT connecting unit 162, the DISA connecting unit 163, or the DID connecting unit 164 corresponding to the terminating connection method CONN sends a call to the public network 2 according to the procedure applicable to the terminating connection method CONN, and sends the subscriber number SN to be connected to the called PBX unit 1 and the called extension number EN as necessary. Therefore, the public network 2 connects the numbers to the called extension 4 of the called PBX unit 1 according to the well-known procedure, thus providing a virtual private network service for the extension 4 without mounting in the public network 2 a special unit for providing the service (for example, the virtual private network center 22, etc.).

The above described embodiment is only one aspect of the present invention. For example, the number converter 100 and the outgoing call controller 200 are not limited to the number converting unit 161, the ATT connecting unit 162, the DISA connecting unit 163, and DID connecting unit 164, but they can be configured with many other variations and the same effect of the present invention.

Additionally, the present invention is not limited to the embodiment shown in FIG. 16, but can be configured with other variations when a public network and a private network are combined into a virtual private network.

What is claimed is:

1. A virtual private network connecting system in combination with a virtual private network formed by accommodating in a public network a plurality of PBX units each assigned a unique private office number, each of said PBX units comprising:
    number converting means for converting a private office number assigned to a destination PBX unit to a subscriber number assigned to said destination PBX unit by said public network and identifying a method of terminating a call from said public network to said destination PBX unit when an extension accommodated in one of said PBX units issues a call and dials said private office number assigned to said destination PBX unit; and
    outgoing call control means for controlling communication between a called extension accommodated in said destination PBX unit through said public network according to a number conversion result provided by said number converting means and a result of the identification of the method of terminating connection.

2. A virtual private network connecting system according to claim 1, wherein
    said virtual private network comprises:
    a first public network connected to one or more PBX units,
    a second public network:
    a private network for connecting said first public network to said second public network,
    a first switching unit for connecting said first public network to said private network, and
    a second switching unit for connecting said private network to said second public network.

3. A virtual private network connecting system according to claim 1, wherein
    said number converting means comprises a number conversion table containing a subscriber number assigned to said destination PBX unit by said public network corresponding to said private office number, and a number converting unit for converting said private office number and identifying said method of terminating connection according to contents of said number conversion table, and
    said outgoing call control means comprises an attendant intervention method connecting unit for controlling together with an attendant console the communication between extensions of said one calling PBX unit and said destination PBX unit when said terminating connection method identification result indicates an attendant intervention method, a direct inward system access method (DISA) connecting unit for controlling together with said destination PBX unit the communication between the extensions when said terminating connection method identification result indicates a direct inward system access method, and a direct dial-in method connecting unit for controlling together with said destination PBX unit the communication between the extensions when said terminating connection method identification result indicates a direct dial-in method.

4. A virtual private network connecting system according to claim 3, wherein
    each of said PBX units comprises a main memory which contains said number conversion table.

5. A virtual private network connecting system according to claim 3, wherein
    said number converting unit of said calling PBX unit detects the stored contents of said number conversion table according to said private office number, extracts a subscriber number and a terminating connection method corresponding to said private office number, and recognizes that said terminating connection method is an attendant intervention method on receiving as a dial transmission a virtual private network identification number along with said private office number from said extension accommodated in said calling PBX unit; and
    said attendant intervention method connection unit in said calling PBX unit dial-transmits said extracted subscriber number to said public network, said public network routes the call to said destination PBX unit, said destination PBX unit displays a receive signal on the attendant console of said destination PBX unit, said attendant console performs a responding operation, and said calling PBX unit connects the extension of said calling PBX unit to a corresponding office line.

6. A virtual private network connecting system according to claim 3, wherein
    said number converting unit of said calling PBX unit detects stored contents of said number conversion table according to said private office number, extracts a subscriber number corresponding to said private office number and a terminating connection method, and recognizes that said terminating connection method is a direct inward system access method on receiving as a dial-transmission a virtual private network identification number and an extension number of said called extension along with said private office number from said extension accommodated in said calling PBX unit; and
    said direct inward system access method connecting unit of said calling PBX unit dial-transmits said extracted subscriber number to said public network, said public network routes the call to said destination PBX unit, said destination PBX unit automatically responds to said calling PBX unit, said calling PBX unit sends the extension number of said called extension accommodated as an added number to said destination PBX unit, said destination PBX unit alerts said called extension, and said calling PBX unit connects said calling extension thereof to an office line of said public network.

7. A virtual private network connecting system according to claim 6, wherein said direct inward system access method connecting unit of said calling PBX unit activates a response monitoring timer of said public network for monitoring a response from said public network after dial-transmitting to said public network said subscriber number extracted by said number converting unit, and restores said calling extension and said office line between said calling PBX unit and said public network when said timer is timed out before receiving calling and dial tones from said destination PBX unit or a reverse signal from said public network, and said timer is cleared by returning said calling and dial tones or receiving the reverse signal from said public network before the timeout of said timer.

8. A virtual private network connecting system according to claim 3, wherein said number converting unit in said calling PBX unit detects the stored contents of said number conversion table according to said private office number, extracts a local code of said destination PBX unit as a subscriber number corresponding to said private office number, and the terminating connection method, and recognizes that said terminating connection method is a direct dial-in method upon receiving, as a dial-transmission, a virtual private network identifying number and an extension number of said called extension along with said private office number from said extension of said calling PBX unit; and said direct dial-in method connecting unit in said calling PBX unit dial-transmits to said public network the local code as the extracted subscriber number and said extension number of said called extension accommodated in said destination PBX unit, said public network routes the call to said destination PBX unit, said destination PBX unit temporarily responds to said public network, said public network sends the extension number of said called extension, said destination PBX unit alerts said called extension, and said calling PBX unit connects said calling extension to an office line.

* * * * *